Feb. 27, 1940.  M. H. HUNTER  2,191,568
VEHICLE AND EXERCISER
Filed June 15, 1938  2 Sheets-Sheet 1
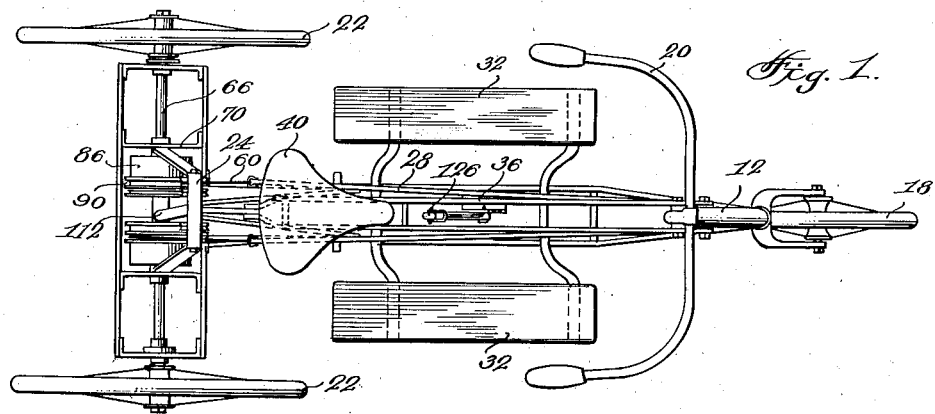
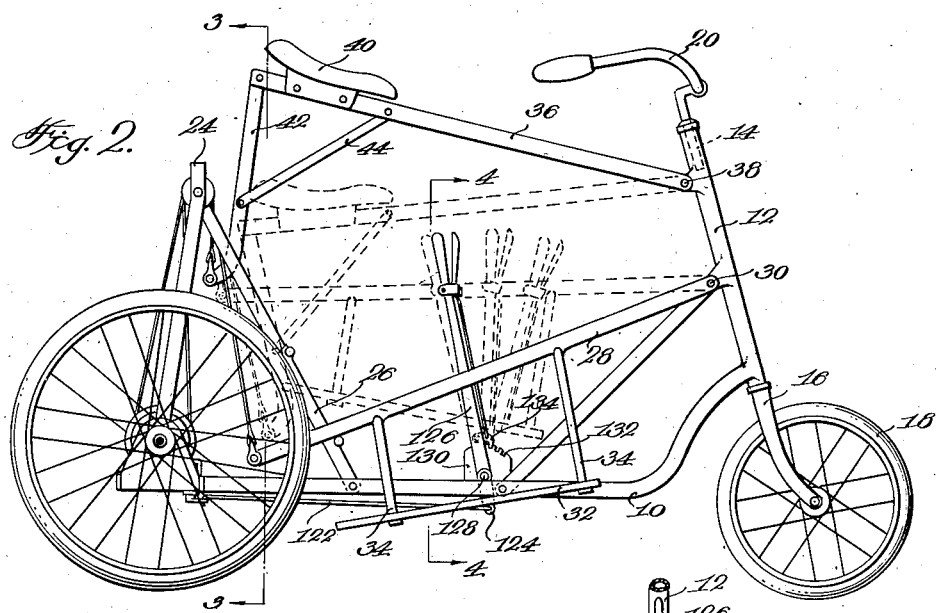
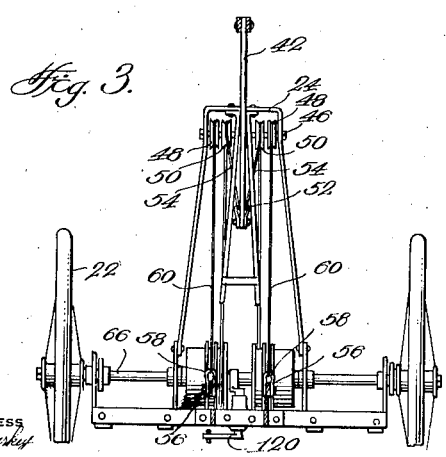
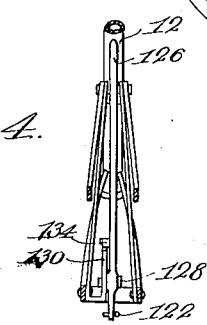
Michael H. Hunter
INVENTOR
BY Victor J. Evans & Co.
ATTORNEYS Feb. 27, 1940.    M. H. HUNTER    2,191,568
VEHICLE AND EXERCISER
Filed June 15, 1938    2 Sheets-Sheet 2
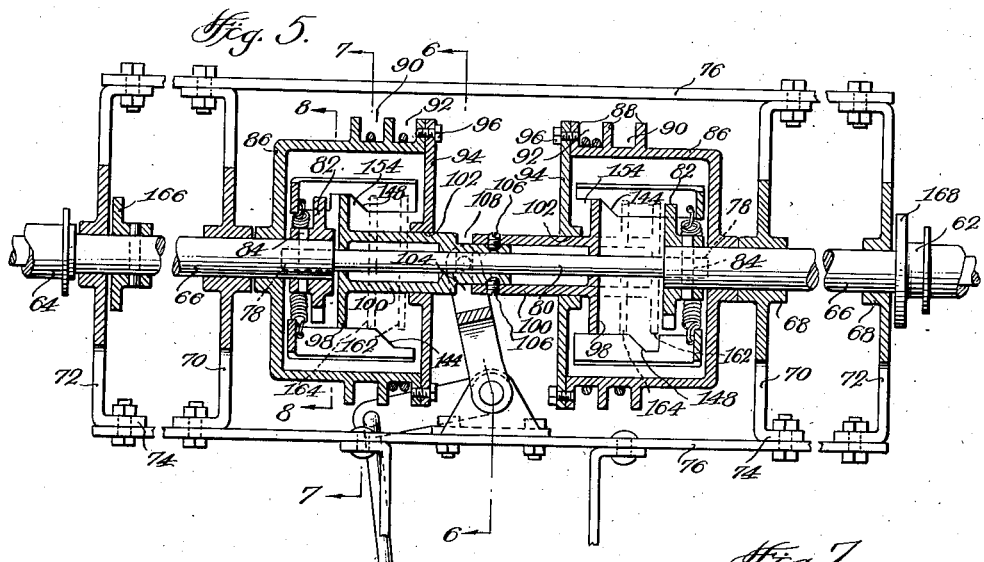
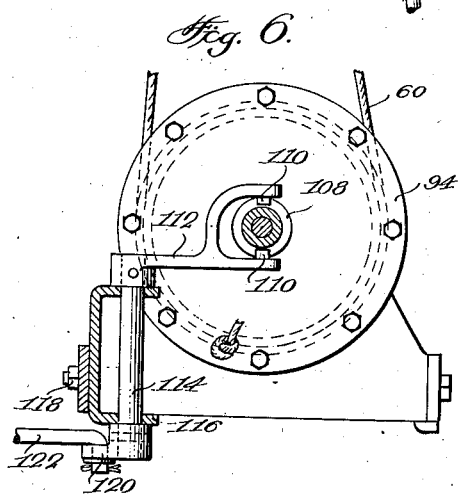
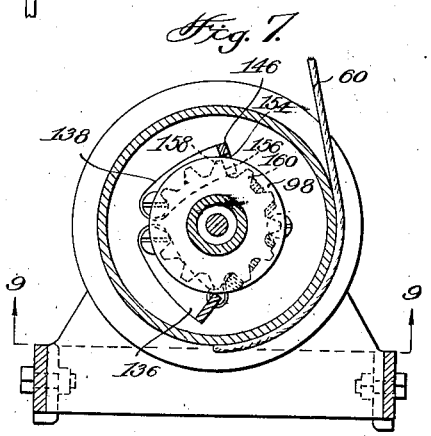
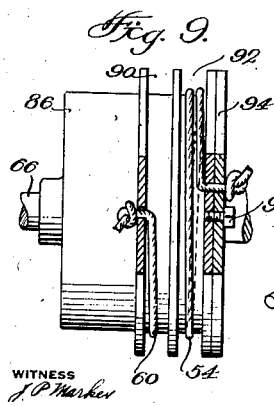
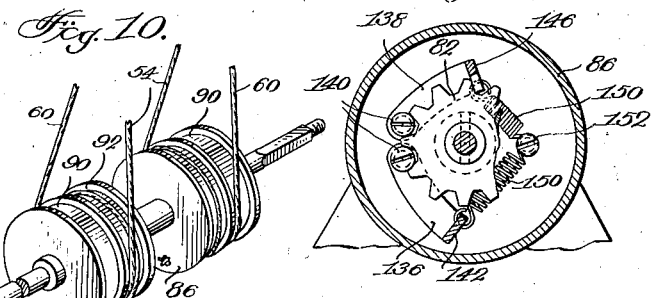
Michael H. Hunter
INVENTOR
BY Victor J. Evans & Co.
ATTORNEYS Patented Feb. 27, 1940

2,191,568

UNITED STATES PATENT OFFICE 2,191,568

VEHICLE AND EXERCISER

Michael H. Hunter, Hammond, Ind.

Application June 15, 1938, Serial No. 213,943

2 Claims. (Cl. 280—223)

My invention relates to vehicles and includes among its objects and advantages the provision of novel propelling means with the vehicle so designed as to additionally constitute an exerciser.

In the accompanying drawings:

Fig. 1 is a plan view of a vehicle embodying my invention;

Fig. 2 is a side elevation;

Fig. 3 is a sectional view along the line 3—3 of Fig. 2;

Fig. 4 is a sectional view along the line 4—4 of Fig. 2;

Fig. 5 is an enlarged sectional view of the clutch mechanism;

Fig. 6 is a sectional view along the line 6—6 of Fig. 5;

Fig. 7 is a sectional view along the line 7—7 of Fig. 5;

Fig. 8 is a sectional view along the line 8—8 of Fig. 5;

Fig. 9 is a view taken from the position indicated by line 9—9 of Fig. 7 with certain parts broken away for the sake of clearness; and Fig. 10 is a perspective view of the drum units associated with the clutch mechanism.

In the embodiment selected to illustrate my invention, I make use of a frame 10 having a tubular guide 12 which rotatably supports a shaft 14 forked at 16 for connection with a front wheel 18 in the manner of conventional bicycle constructions. Handle bars 20 are connected with the shaft 14 for turning purposes. The rear end of the frame 10 is supported by two wheels 22 which supply traction for the vehicle.

Frame 10 carries an upright frame 24 which is braced through the medium of diagonal members 26. A movable frame 28 is pivotally connected at 30 with the frame 10 and carries footboards 32 supported through the medium of brackets 34. An upper frame 36 is pivotally connected at 38 with the frame 10 and carries a seat 40. Frame 36 includes a right angular bar 42 interbraced by a diagonal member 44.

Frame 28 is actuated about its axis through the medium of the footboards 32 while the frame 36 is actuated through the medium of the weight of the operator seated on the seat 40. The two frames pivot simultaneously but in opposite directions, which action supplies power for propelling the vehicle.

Fig. 3 illustrates the upstanding frame 24 as being provided with a shaft 46 upon which grooved wheels 48 and 50 are rotatably mounted. To the lower end of the member 42, I connect a loop 52 to which cables or ropes 54 are attached. These cables or ropes pass around the grooved wheels 50. To the rear ends of the bars 56 comprising the frame 28, I connect loops 58 which, in turn, are connected with cables or ropes 60 passing around the grooved wheels 48.

In Fig. 5, I illustrate the hubs 62 and 64 associated with the wheels 22 as being mounted on axles 66 which are axially aligned. These axles are rotatably supported by bearings 68 carried by cross members 70 and 72 having right angular bends 74 bolted to frame members 76 paralleling the axles. Axles 66 are bored at 78 for the reception of a connecting shaft or axle part 80. To the inner end of each axle part 66 I fixedly connect a clutch sprocket 82 by a pin 84 which also keys one end of the connecting shaft or axle 80.

Upon the inner ends of the axles 66 I rotatably mount drums 86. Each drum is provided with three flanges 88 spaced to provide grooves or channels 90 and 92. Each drum includes two channels. The cables or ropes 54 actuated through the medium of the seat of the vehicle are wound upon the drums 86 in the channels 92, but the ropes are wound in opposite directions so that simultaneous unwinding of the ropes will rotate the drums in opposite directions. The ropes or cables 60, actuated through the medium of the footboards, are wound upon the drums 86 in the channels 90, which ropes or cables are also wound in reverse directions in the same way as the ropes or cables 54.

Each drum 86 is provided with a closure plate 94 connected with one flange 88 thereof through the medium of bolts 96. Within each drum 86 I mount a cam disk 98. The disks 98 are provided wtih tubular extensions 100 which are slidable through openings 102 in the plates 94. One of the tubular extensions 100 carries a neck 104 extending into the other extension and fixedly connected therewith by set screws 106. The extensions 100 are spaced to provide an annular channel 108 within which pins 110 of a forked lever 112 extend. This lever is fixedly connected with a shaft 114 rotatably supported by a bracket 116 fixedly connected with one of the members 76 by bolts 118. A right angular arm 120 is fixedly connected with the shaft 114 and is in turn connected with a rod 122 having its opposite end connected at 124 with the lower end of a lever 126 pivotally connected at 128 with a bracket 130 anchored to the frame 10. Bracket 130 includes a quadrant 132 which cooperates with the pawl 134 of the lever 126 for latching the same in a forward, neutral or rearward position.

Adjustment of the lever 126 shifts the cam disks 98 longitudinally of the connecting shaft 80. Forward or rearward motion of the vehicle is determined by the position of the cam disks 98, while in the neutral position of the lever, the frames 28 and 36 may be actuated through the medium of the footboards 32 and the seat 40 without imparting propelling motion to the vehicle. Under such conditions, the vehicle may be employed as an exerciser.

In Figs. 7 and 8, I illustrate one of the drums 86 and the clutch mechanism associated therewith. The clutch mechanisms associated with the two drums are identical in construction and operation so that the description of one will apply to both. Fig. 8 illustrates two clutch dogs 136 and 138 as being pivotally mounted at 140 upon the end wall of the drum 86. Clutch dog 136 includes a right angular bar 142 having a cam edge 144 near its outer end (see Fig. 5). Similarly, clutch dog 138 includes a right angular bar 146 having a cam edge 148 (see Fig. 5). The bars 142 and 146 are urged inwardly of the clutch sprocket 82 by springs 150, each having one end connected with its respective bar and its opposite end connected with an anchor screw 152 threaded into the drum 86.

The positions of the clutch dogs 138 and 136 are determined by the position of the cam disk 98. Fig. 7 illustrates the cam disk 98 as lying within the recess 154, at which time the bar 146 has latching relation at 156 with the tooth 158 of the cam sprocket. Thus, a pull on the cable or rope 60 connected with the drum 86 will impart rotary motion to the clutch sprocket 82. Such rotation of the sprocket imparts rotary motion to the wheel axle for propelling the vehicle.

Referring again to Fig. 7, it will be noted that the bar 146 parallels one side of the face of the tooth 156 so that it will remain in such relation even though forces are applied thereto. However, rotation of the drum 86 in the opposite direction will bring the tooth 160 into engagement with the bar, but the angularity of the tooth with respect to the edge of the bar is such as to cause the latter to lift, which is also true with respect to engagement of the bar with succeeding teeth during rotation of the drum in the same direction. It will thus be seen that the bar and the clutch sprocket constitutes a ratchet mechanism.

The clutch disks 98 of Fig. 9 are illustrated under adjustment for forward speed of the vehicle. By moving the lever to the forward dotted line position of Fig. 2, the cam disks 98 will be shifted to the dotted line positions 162, at which time the clutch mechanisms are adjusted for rearward motion of the vehicle. With the lever 126 adjusted to the central portion of Fig. 2, the cam disks 98 will take the positions 164, at which time the clutch mechanisms are in neutral. In moving the cam disks 98 to the 164 positions, the disks pivot the clutch dogs 136 and 138 outwardly from their respective clutch sprockets 82 sufficiently far to hold them out of engagement therewith.

In operation, the structure of Fig. 5 embodies a double clutch mechanism so arranged that as one drum is being rotated for propelling purposes, the other drum is being rotated in the opposite direction for positioning the ratchet feature so as to impart propelling motion to the drum as the direction of rotation of the drums is reversed. The vehicle is operated by leg and body movement for oscillating the frames 28 and 36. Fig. 2 illustrates the range of movement of the two frames. As the frame 28 pivots upwardly, the cables or ropes 60 are wound upon the drums 86, but the drums are simultaneously rotated in opposite directions because of the reverse winding of the cables or ropes. At the same time, the cables or ropes 54 associated with the frame 36, which pivots downwardly as the frame 28 pivots upwardly, are unwound from the drums 86, but the cables or ropes 54 are also reversely wound in the same manner as the cables or ropes 60. The clutch units operate in the manner of ratchets so that continuous motion is imparted to the vehicle through the medium of the two oscillating frames. By adjusting the lever to the central or neutral position of Fig. 2, the cam disks 98 render the clutch dogs 136 and 138 inoperative so that oscillation of the frames 28 and 36 will impart no forward or rearward motion to the vehicle.

In Fig. 5, the axle parts 66 respectively carry fixed flanges 166 and 168 which are arranged to be brought into frictional relation with their respective members 72 by exerting a rearward pull on the lever 126 when in its full line position of Fig. 2 for braking the vehicle in the forward direction of propulsion. Cross members 70 and 72 are fixedly connected with the members 76 to provide a frame unit. Arm 120 is fixedly related to the arm 112 through the medium of the shaft 114 so as to function as a bell crank. Thus, a rearward pull on the lever 126 when in the full line position of Fig. 2, will tend to shift the frame to the right or the axle structure to the left for bringing the flanges 166 and 168 into frictional engagement with their respective members 72, see Fig. 5. The axle parts 66 are rotatably journaled in the frame, and the frame is characterized by limited movement longitudinally of the axle structure.

Drums 86 in combination with their respective plates 94 provide chambers which may be filled with a suitable lubricant for lubricating the internal mechanism. At the same time, such lubricant acts as a silencer for the moving parts.

While I have described a transmission mechanism adjustable to forward, rearward and neutral positions, it is obvious that the vehicle, in any adjusted position of the transmission, will function as a coaster when traveling either forward or rearwardly under suitable road conditions.

Without further elaboration, the foregoing will so fully explain my invention that others may, by applying current knowledge, readily adapt the same for use under various conditions of service.

I claim:

1. A vehicle including a frame having a supporting wheel and drive wheels, a seat pivotally connected with said frame, foot operated propulsion means pivotally connected with said frame, an axle connecting said drive wheels and rotatably journaled in a portion of said frame, drums mounted loosely on said axle, a pair of flexible lines connected with said seat with the lines wound oppositely on said drums, a pair of flexible lines connected with said foot operated propulsion means and wound oppositely on said drums, said lines being wound on and unwound from said drums when said seat and the foot actuated propulsion means are moved about the axes of their pivotal connections with said frame and said seat and the foot actuated propulsion means being arranged for simultaneous pivotal movement in opposite directions to impart simultaneous rotation of said drums in opposite directions, ratchet mechanisms enclosed in said drums and cooperable with the latter and said axle for rotating the latter to drive said drive wheels, ratchet mechanism adjusting means slidable longitudinally of said axle for adjusting the ratchet mechanisms to forward, rearward and neutral conditions, and means for shifting said ratchet adjusting means.

2. A vehicle including a frame having a supporting wheel and drive wheels, a seat pivotally connected with said frame, foot operated propulsion means pivotally connected with said frame, an axle connecting said drive wheels and rotatably journaled in a portion of said frame, drums mounted loosely on said axle, a pair of flexible lines connected with said seat with the lines wound oppositely on said drums, a pair of flexible lines connected with said foot operated propulsion means and wound oppositely on said drums, said lines being wound on and unwound from said drums when said seat and the foot actuated propulsion means are moved about the axes of their pivotal connections with said frame and said seat and the foot actuated propulsion means being arranged for simultaneous pivotal movement in opposite directions to impart simultaneous rotation of said drums in opposite directions, ratchet mechanisms enclosed in said drums and cooperable with the latter and said axle for rotating the latter to drive said drive wheels, ratchet mechanism adjusting means inside said drums for adjusting the ratchet mechanisms to forward, rearward and neutral conditions, sleeve means slidable longitudinally of said axle for actuating said ratchet mechanism adjusting means, and a lever actuated linkage mounted on said frame and connected with said sleeve means for actuating the latter.

MICHAEL H. HUNTER.